W. A. CAMPBELL.
COOKING CABINET.
APPLICATION FILED MAR. 13, 1911.

1,046,734.

Patented Dec. 10, 1912.

WITNESSES:

INVENTOR.

UNITED STATES PATENT OFFICE.

WILLIAM A. CAMPBELL, OF KENTON, OHIO.

COOKING-CABINET.

1,046,734.     Specification of Letters Patent.     Patented Dec. 10, 1912.

Application filed March 13, 1911. Serial No. 614,237.

*To all whom it may concern:*

Be it known that I, WILLIAM A. CAMPBELL, a citizen of the United States, residing at Kenton, in the county of Hardin and State of Ohio, have made Improvements in Cooking-Cabinets, of which the following is a description.

My invention relates to improvement in a cooking cabinet whereby cooking and baking can be attained by heat from combustion in combined operation.

The peculiar construction of my contrivance is composed of casings arranged and formed on the following plan: a casing inclosing a baking chamber having the top portion perforated and in the bottom heat receiving inlets being adapted to be set over a heat producing source; an inner casing surrounding the baking chamber having perforations in the lower portion thereof and the casing spaced from said baking chamber to form a flue space therebetween. An outer casing is spaced from the inner casing forming cooking spaces therebetween at the top and the sides of the inner casing, and perforated shelves are situated in the side spaces and an outlet flue is formed near the top and rear portion of the outer casing provided with a regulating damper therein. This arrangement of the cooking cabinet is such that the heat from a suitable source may be utilized for cooking and baking process in combined operation.

Reference is to be had to the accompanying views of the contrivance shown on the drawings forming a part of the application in which similar letters of reference indicate corresponding parts and relative arrangement.

Figure 1:
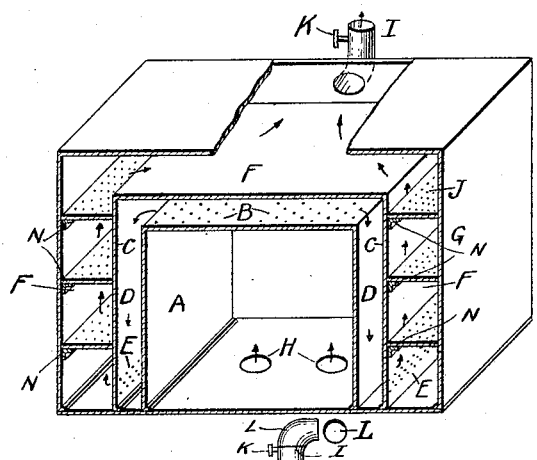
Figure 2:
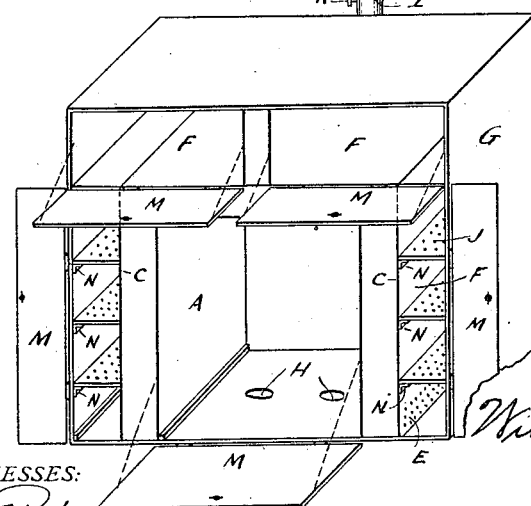

Figure 1 is a transverse, vertical section of the cabinet illustrating the design. Fig. 2 is a view in front elevation illustrating the closures and flue connections of the cabinet.

In the practical construction of my cooking cabinet the same is constructed of sheet metal with the several parts united and secured by suitable means.

In the peculiar construction of my cabinet, the same is composed of casings, of which A indicates the casing inclosing the baking chamber having the top portion perforated shown at B and in the bottom heat receiving inlets denoted at H. The inlets are adapted to be set over a heat producing source, and the perforations in the top surface are adapted to discharge the heat and products of combustion within the chamber therethrough.

C indicates the inner casing surrounding the baking chamber and spaced therefrom forming a flue space therebetween, shown at D, adapted to receive the heat and products of combustion from within the baking chamber through the perforated top and to conduct, radiate and discharge the said heat and products of combustion through the perforations in the lower portion of casing C, denoted at E into the cooking spaces at the sides and top of casing C indicated by F, which are formed by the relative arrangement of an outer casing denoted by G and spaced from the casing C.

Perforated shelves situated in the side spaces between casings C and G are shown at J and secured by suitable means indicated by N.

An outlet flue formed near the top and rear portion of casing G denoted at I has communication with the cooking spaces and with the flue space and the baking chamber, as shown by arrows in Fig. 1 of the drawings whereby the heat from a suitable source may be set in motion throughout the cabinet and used to bake and cook in combined operation. This outlet flue is adapted to connect with other outer flues shown by L in Fig. 2 whereby the undesirable products of combustion and odors in the cabinet may be removed. A regulating damper is shown at K within this outlet flue to control the draft within the cabinet.

From the foregoing description taken in connection with the drawings the usefulness of my invention will be seen.

Having thus described my cooking cabinet, what I claim and desire to secure by Letters Patent is:

1. In a cooking cabinet of the nature described, the combination of a casing forming a baking chamber having the top portion perforated and heat receiving inlets in the bottom; of an inner casing having the lower portion perforated, said inner casing surrounding the baking chamber and spaced therefrom forming a flue space therebetween; of an outer casing having an outlet flue formed at the upper portion thereof, said outer casing spaced from said inner casing and forming cooking spaces between the said casings and perforated shelves situated and supported within said cooking spaces; said baking chamber and flue space having heat communication with each other through the said perforated top portion of the baking chamber and the said flue space and cooking spaces having heat communication with each other through the said perforations in lower portion of the inner casing whereby the heat and products of combustion from a suitable source received therein, may be circulated, radiated and distributed for the purposes as substantially set forth.

2. In a cooking cabinet of the nature described, the combination of a casing forming a baking chamber having the top portion perforated and in the bottom heat receiving inlets adapted to set over a heat source; of an inner casing having the lower portion perforated, said inner casing surrounding the said baking chamber and spaced therefrom forming a flue space therebetween; of an outer casing having at its upper portion an outlet flue, provided with a regulating damper therein, said outer casing spaced from the said inner casing forming cooking spaces between the said casings and perforated shelves situated within said cooking spaces, said outlet flue adapted to connect with other outer flues, whereby the heat and products of combustion may be set in motion throughout the cabinet and the effect used for the purposes as set forth.

3. In a cooking cabinet of the nature described, the combination of a baking chamber formed with a casing having the top portion perforated and heat receiving inlets in the bottom; of an inner casing having the lower portion perforated, said casing surrounding the said baking chamber and spaced therefrom forming a flue space therebetween; of an outer casing having at the upper portion thereof an outlet flue with a damper therein, said outer casing spaced from the said inner casing forming cooking spaces between the said casings, and perforated shelves situated within the said cooking spaces; said baking chamber and cooking spaces having closures whereby the effects of heat may be used for the purposes, as substantially set forth.

WILLIAM A. CAMPBELL.

Witnesses:
MARY B. SCOTT,
JAMES WATT.

Copies of this patent may be obtained for five cents each, by addressing the "Commissioner of Patents, Washington, D. C."